Patented June 3, 1941

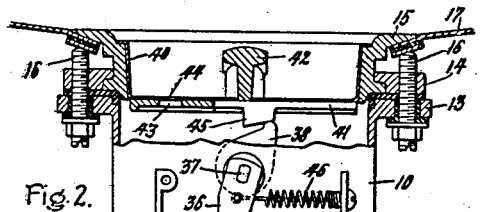

2,244,402

UNITED STATES PATENT OFFICE 2,244,402

WASTE DISPOSAL APPARATUS

James H. Powers, Fort Wayne, Ind., assignor to General Electric Company, a corporation of New York Application January 14, 1939, Serial No. 250,975

10 Claims. (Cl. 83—6)

The present invention relates to waste disposal apparatus, more particularly of the kind designed for disposal of garbage and other forms of waste material by comminution of the material and flushing of the comminuted material into a sewer or the like with the aid of water.

Among the objects of the invention is the provision of improved and simplified control mechanism for increasing the efficiency, reliability, and safety of operation of such waste disposal apparatus.

More particularly, an object of the invention is the provision of control mechanism for a waste disposal appliance, embodying means for preventing operation of the comminuting mechanism of the appliance in the absence of a supply of water adequate for the disposal operation.

In the operation of waste disposal apparatus of the kind referred to, a generous flow of water is necessary to facilitate reduction of the waste materials to proper flowable state for passage through the discharge clearances and piping system, and to act as a carrier for flushing comminuted material to the sewer or other receiving means. Where, as is common practice, particularly in domestic installations, a waste disposal appliance is connected with the drain opening of a kitchen sink or like structure for convenience in charging the appliance with food wastes, it is usual to employ the faucet of the sink or like structure for supplying the required water to the appliance. Ordinarily an operator, if given proper instructions, will turn on the faucet to give an adequate water flow when operating the comminuting mechanism of the appliance. However, it has been found that sometimes, through ignorance, carelessness, or forgetfulness, an operator either will fail to turn on the water or will open the faucet to supply only an inadequate flow. As the result of such inadequate water flow, there may arise troubles such as retardation or blocking of moving parts of the comminuting mechanism so as to retard the elimination process, clogging of the discharge clearances and piping system, and, under some conditions, even impairment of the water seal in the plumbing trap.

Simplified control arrangements have been proposed whereby manual operation of a single master control element serves mechanically to close a switch for energization of the driving motor of a waste disposal appliance and at the same time mechanically to open a valve for supplying water to the appliance. However, such arrangements as heretofore proposed, have not solved the problem of insuring adequate water supply whenever the motor driven comminuting mechanism is placed in operation. This is due to the fact that a predetermined movement of the master control element effects closure of the motor switch to cause operation of the comminuting mechanism regardless of conditions in the water supply system. For example, the master control can be operated to close the motor switch and open the valve to the appliance even though the water in the supply system may be turned off so that no water can flow to the appliance. Or, more commonly, the drawing of water at some other point in the supply system may so reduce the system pressure that insufficient water will flow to the appliance even though the valve to the appliance is operated to fully open position by the master control. Thus, even with control arrangements employing a single master control for mechanically actuating both the motor switch and the water valve, there may arise conditions such that operation of the master control will effect operation of the comminuting mechanism without adequate flow of water to aid in the disposal operation, thereby giving rise to the troubles referred to hereinbefore.

It is, therefore, one of the more specific objects of the present invention to provide a control mechanism for a waste disposal appliance, embodying a flow responsive device interconnected in such manner as to render operation of the control mechanism dependent upon the flow of water to aid in the disposal operation.

Other objects, as well as the details of that which I believe to be novel and my invention, will become apparent from the following description and the claims appended thereto, taken in conjunction with the accompanying drawing wherein Fig. 1 shows in perspective and partially cut away, an exemplary form of waste disposal apparatus having control mechanism embodying my present invention; Fig. 2 shows, partially in section, a portion of the control mechanism which is manually operable; Figs. 3 and 4 show respectively a side elevation and a longitudinal section of an improved flow responsive switching device for use as part of the control mechanism, and Fig. 5 is a diagrammatic illustration of the electric circuit connections of the control mechanism.

The waste disposal appliance illustrated in Fig. 1 of the drawing is of the form disclosed and claimed in my previous application, Serial No. 182,775, filed December 31, 1937, and assigned to the assignee of the present invention, and is provided with a manually operable control of the form disclosed and claimed in my Patent No. 2,185,037, dated December 26, 1939, and also assigned to the assignee of the present invention. It is to be understood, however, that the illustration of this particular form of appliance and manual control is for purposes of example only and that my present invention is not limited by the details of the illustrated appliance and cooperative manual control. Hence, only sufficient of these details will be set forth herein as is required to convey a complete understanding of the present invention.

As will be seen particularly from Fig. 1 of the drawing, the housing or casing of the appliance consists in the main of an upper part 10 and a lower part 11 joined by a slip connection, indicated at 12, to provide for positional adjustment of the lower part relative to the upper part. The upper housing part is adapted to be relatively permanently joined, as best shown in Fig. 2, by means of flange 13, clamping ring 14, adapter ring 15, and bolts 16, to a kitchen sink or like structure 17 with the opening in the upper end of the housing in registry with the drain opening of the structure 17 so that water, supplied to structure 17 by faucet 18, may flow through the drain opening into the housing for aid in the waste disposal operation. Additional support for the appliance is provided by a floor mounted stand having a base 20 and vertically adjustable brackets 21 attached to the lower housing part. The bottom plate 22 of the lower housing part is provided with a discharge duct 23 adapted to be connected, through a trap 24, to a sewer connection pipe 25 for conducting water and comminuted material from the appliance.

Comminution of waste material, which is fed through the drain opening in structure 17 and through upper housing part 10 into the grinding chamber defined by lower housing part 11, is accomplished by means of a stationary shredding and cutting device 28 and a rotatable impelling and reducing device 29. The stationary device is mounted in a recess in the wall of part 11 while the rotatable device is supported by bottom plate 22 and connected to be driven by means of an electric motor 30 supported beneath bottom plate 22. For a detail description of the construction and operation of the comminuting means, reference may be had to my previously referred to application Serial No. 182,775.

For manual control of the operation of motor 30, there is provided a switch 31 mounted on the side of housing part 10 and enclosed in a casing 32, as shown in Figs. 1 and 2. Power for operation of the motor is supplied through a connection cord 33 which is connected with control switch 31 and may be plugged into any suitable electric outlet as indicated at 34, connection to the motor being effected through cable 39. Switch arm 35 of switch 31 is connected for actuation by a lever 36 mounted on the outer end of a shaft 37 which extends through the side of upper housing part 10. On the inner end of shaft 37 and in fixed relation to lever 36 is a second lever 38 which is disposed within the upper end of housing part 10 for actuation by a combined drain closure and control device of the form described in detail in my applications previously identified. This device comprises a cup-shaped strainer member 40, adapted to seat in the opening of adapter ring 15, and a baffle plate 41 mounted on the lower side of the strainer member. Baffle plate 41 is supported for rotation by a handle 42 and has perforations, one of which is indicated at 43, arranged to be moved into and out of registry with cooperating perforations, one of which is indicated at 44, in member 40. Depending from baffle plate 41 is a cam projection 45 which is arranged to be moved into engagement with lever 38 for actuation of the switching mechanism. As described, particularly in my application Serial No. 182,775, baffle plate 41 and handle 42 have three control positions. When the handle points to "Remove," as indicated in Fig. 1, cam projection 45 is out of engagement with lever 38 so that a biasing spring 46, connected with lever 36, is operative to maintain switch arm 35 in "Off" position. Under these conditions, member 40 may be removed from the drain opening, or it may be left in the drain opening to serve as a strainer since the perforations 43 in baffle plate 41 are in registry with the perforations 44 in member 40. With member 40 in the drain opening, handle 42 may be rotated in a counterclockwise direction to the "Seal" position to close the perforations in the strainer member and thereby permit filling of the sink for any desired purpose. A further counterclockwise rotation of handle 42 to the "On" position again opens the perforations 44 so that water may flow from the sink into the housing of the appliance, and also causes cam projection 45 to engage lever 38 so as to effect actuation of switch arm 35 to the "On" position, shown in Fig. 2, for energization of motor 30. To effect deenergization of the motor, handle 42 is returned to either the "Seal" or "Remove" position which permits spring 46 to return switch arm 35 to "Off" position.

In the particular installation herein described, the flow of water for aid in the disposal operation is secured from faucet 18, preferably the cold water side, connected with water supply line 50. As previously indicated herein, it is desirable to insure that the comminuting mechanism can be placed in operation only when the flow of water is adequate for proper disposal of the comminuted material. To this end and in accordance with the present invention, I have provided a control mechanism including a flow responsive device which prevents energization of motor 30 by the manually operable control, hereinbefore described, unless the proper amount of water is flowing to the waste disposal appliance. In the exemplary embodiment illustrated, the flow responsive device, generally designated 51, is connected in supply line 50, directly beneath structure 17, as shown in Fig. 1. However, it is possible, and may be more convenient under some circumstances, to install the flow responsive device at some other point in the system where it will be responsive to the flow of the water supplied to the appliance. In case the device is installed in a water line at some locality such as in the cellar, care should be exercised to see that the water line in which the installation is made does not supply fixtures other than the sink or like structure in which the waste disposal appliance is connected. In carrying out the present invention, various forms of flow responsive devices may be employed, but I prefer to employ the improved flow switch which forms the basis of my copending application Serial No. 250,976, filed January 14, 1939, and assigned to the assignee of the present invention. Sufficient of the details of the construction and operation of this improved device will be given herein to insure an understanding of the present invention.

As will be seen best from the sectional view of Fig. 4, the flow responsive device 51 has a housing 52 in which are a flow compartment 53 and a switch compartment 54. Flow compartment 53 is connected in water line 50 by means of pipe fittings 55 and 56 threaded respectively into the inlet and outlet ends of the compartment. The inlet end of the flow compartment is in the form of a nipple 57 screw-threaded into housing 52 with the joint sealed by packing washer 58. Within compartment 53 is an axially movable flow actuable element in the form of a plunger 60 the main body 61 of which seats in and is guided by a seat 62 formed in nipple 57. The plunger has an extension or stem 63 which passes through and is guided by a spider 64 screw-threaded on to the inner end of nipple 57, and has also a flange or skirt 65 which rests on the rim of seat 62 when no water is flowing. Formed in nipple 57 at the base of seat 62 is a nozzle-like orifice 66 arranged to discharge a relatively high velocity stream axially against the base of the plunger. A slight clearance is provided between the body 61 of the plunger and the wall of seat 62 for passage of water around the plunger, and the body portion of the plunger is provided with longitudinally-extending ribs 67, the spaces between which prevent jamming of the plunger due to collection of scale or other solid particles in the clearance.

Within compartment 54, which is formed by housing 52 and a removable cover 70, is mounted a switch with actuating mechanism therefor. Though this switch may be of any suitable form, it is preferable that it be of the micro-movement variety, that is, requiring only very small differentials of movement of the switching element thereof to effect opening and closing of the contacts. Such a switch is indicated at 71 in Fig. 3 and the relationship of its principal parts is shown diagrammatically in Fig. 5. Movement of the spring biased switch element 72 of the switch to the open circuit position indicated in Fig. 5 is effected by micro-movement of plunger 73 inwardly under the influence of pressure on the outer end of the plunger. When such pressure is released, the plunger, and with it the spring biased element 72, moves outwardly to effect closure of the circuit between contact terminals 74. These terminals 74 are connected with switch 31 and motor 30 through connection cord 75 so that, as shown by the circuit diagram of Fig. 5, the terminals 74 are in series with the motor and switch 31.

Actuation of plunger 73 is effected by a lever 77 fulcrumed on a through shaft 78 which extends through the partition 79 separating compartments 53 and 54. This through shaft is supported by a nipple 80 screw-threaded into partition 79 and the through shaft is surrounded by any suitable form of packing gland generally indicated at 81. On the inner end of shaft 78 is mounted a lever arm 82 arranged in position to be engaged by stem 63 of plunger 60. One end of lever 77 is provided with an adjustable screw 83 arranged to bear against the outer end of plunger 73. At the other end of lever 77 is a compression spring 84 which acts between lever 77 and an adjustable screw 85 carried by a fixed support 86 on housing 52. This spring biases lever 77 for clockwise rotation, as viewed in Fig. 3, so as to effect inward pressure on plunger 73, thereby to maintain switching element 72 in its open circuit position diagrammatically shown in Fig. 5.

For operation of the apparatus described, with the housing of the appliance charged with waste material and strainer member 40 seated on the drain opening of structure 17, handle 42 is turned to "On" to open the apertures in the strainer member for flow of water from structure 17 to the appliance and to effect closure of switch 31 as previously described. Closure of switch 31, however, is ineffective to cause operation of motor 30 and the comminuting mechanism until an adequate supply of water is flowing from faucet 18. Opening of the faucet permits flow of water through supply line 50 and flow compartment 53. The resultant difference in static pressure on opposite sides of plunger 60, together with the friction due to flow around the plunger and the dynamic pressure on the base of the plunger due to the relatively high velocity flow from orifice 66, then cause movement of plunger 60 in the direction of the arrow in Fig. 4 to exert force on lever arm 82 tending to rotate shaft 78 and lever 77 in opposition to the force exerted by spring 84. The force tending to effect displacement of plunger 60 and, therefore, the force exerted by the plunger on arm 82 tending to effect rotation of lever 77, depend very closely upon the rate of flow through supply line 50 and compartment 53. When the flow through the supply line attains a certain rate, the force exerted by plunger 60 is sufficient to overbalance the force of spring 84 and cause rotation of lever 77 in a counterclockwise direction, as viewed in Fig. 3, to permit outward movement of plunger 73 and closing of the contacts of switch 71 so as to complete the circuit for energization of motor 30. Through adjustment of screw 85, which determines the force exerted by spring 84 in opposition to movement of lever 77, and adjustment of screw 83, which determines the positioning of the lever mechanism relative to the plunger, the operation of the flow responsive mechanism to effect completion of the motor circuit may be rendered very critically responsive to the rate of flow predetermined as being the minimum necessary for proper operation of the disposal apparatus. Also, due to the improved construction of the flow responsive mechanism, as described in detail in my previously referred to application Serial No. 250,976, and to the small amount of movement of lever 77 required to effect operation of switch 71, the device is very sensitive to small variations in rate of flow. As a result of this, a drop of only a few gallons per hour below the rate determined to be the minimum required for proper operation of the disposal apparatus, causes operation of the flow responsive switching mechanism to open the motor circuit. Thus, operation of the comminuting mechanism with inadequate water supply is insured against at all times.

If it is desired for any reason to secure a large volume of flow from faucet 18 without effecting operation of the waste disposal appliance, it is necessary only to turn handle 42 to the position labelled "Remove", whereupon switch 31 is opened so that the comminuting mechanism is rendered inoperative regardless of the operation of flow responsive device 51.

From the foregoing, it will be seen that I have provided an improved control mechanism for a waste disposal appliance, whereby operation of the control mechanism to render the comminuting mechanism of the appliance operative and inoperative is caused to be dependent upon the flow of water to the appliance. As will be obvious to one skilled in the art, various modifications may be made in the details of the embodiment of the invention as herein described and illustrated. For example, under some circumstances, it may be desirable to connect the water supply line directly with the waste disposal appliance. In such case the manually operable switch 31 may be dispensed with and control of the operation of the comminuting mechanism may be effected solely through the agency of a valve for controlling the flow of water to the appliance. It is intended therefore that this and such other modifications as do not depart from the true spirit of the present invention shall come within the scope of the appended claims.

What I claim as new and desire to secure by Letters Patent of the United States is:

1. In combination, a waste disposal appliance including a casing with means for comminuting material in said casing and power means for operating said comminuting means; a conduit system for flow of water to aid in the disposal of the comminuted material and including said casing together with means for supplying water to the casing and means for conducting water and comminuted material from the casing; means for controlling the operation of said power means to render said comminuting means operative and inoperative; and a fluid flow responsive device in said system and operatively connected with said controlling means for rendering said controlling means ineffective to cause operation of said comminuting means whenever there is not a predetermined minimum volume of water flowing in said system.

2. In combination, a waste disposal appliance including a casing providing a grinding chamber and having power driven means for comminuting waste material in said chamber; a conduit system for flow of water to aid in comminution and disposal of waste material and including said chamber together with means for supplying a flow of water to said chamber and means for conducting water and comminuted material from the chamber; and control means for rendering said comminuting means operative and inoperative, which said control means includes a device responsive to flowing of water in said system and operative to prevent operation of said comminuting means at all times when the supply of water to said system is less than a predetermined minimum volume of flow.

3. In a waste disposal apparatus, the combination of means for comminuting waste material, power means for effecting operation of said comminuting means, means for controlling the operation of said power means to render said comminuting means operative and inoperative, means for supplying a flow of water to aid in the disposal of the comminuted material, means for discharging the water and comminuted material to a sewer system or the like, and a flow responsive device having an element arranged for actuation by such flow of water and operative, in the absence of such flow of water, to render said controlling means ineffective to cause operation of said comminuting means.

4. In a waste disposal apparatus, the combination of means for comminuting waste material, an electric motor for effecting operation of said comminuting means, means for supplying a flow of water to aid in the disposal of the comminuted material, means for discharging water and comminuted material to a sewer system or the like, switching means for controlling the operation of said motor, and a flow responsive device having an element arranged for actuation by such flow of water and operative, in the absence of such flow of water, to render said switching means ineffective to cause operation of said motor.

5. In combination, a waste disposal appliance including a casing with electric motor operated means for comminuting material in said casing; a conduit system for flow of water to aid in disposal of the comminuted material and including said casing together with means for supplying water to said casing and means for conducting water and comminuted material from the casing; means including a switch for controlling the operation of said motor operated means, and a flow responsive device in said system and operatively connected with said switch for effecting closure of the switch only when a flow of water in excess of a predetermined minimum volume is supplied to said system.

6. In combination, a waste disposal appliance including a casing with electric motor operated means for comminuting material in said casing; a conduit system for flow of water to aid in disposal of the comminuted material and including said casing together with means for supplying water to said casing and means for conducting water and comminuted material from the casing; and control means for said appliance including a first switch for rendering said motor operated means operative and inoperative, a second switch in series with said first switch, and a flow responsive device having an element actuable by flowing of water in said conduit system and operative to effect closure of said second switch only in case water is flowing in said system in excess of a predetermined minimum volume.

7. In combination with a waste disposal appliance having means for comminuting waste material and power means for operating said comminuting means; a water line for supplying water to said appliance for aid in the disposal of comminuted material; means for conducting water and comminuted material from said appliance; control means for rendering said power means operative and inoperative to effect operation of said comminuting means; and a flow responsive device in said water line and operatively interconnected with said control means to render the control means ineffective to cause operation of said comminuting means by said power means unless a volume of water in excess of a predetermined minimum is flowing through said water line to said appliance.

8. In combination, with a waste disposal appliance having electric motor operated means for comminuting waste material, a water line for supplying a flow of water to said appliance for aid in the disposal of comminuted material, means for discharging water and comminuted material from the appliance, means including a switch in circuit with said motor for controlling the operation of said comminuting means, and a flow responsive device having an element actuable by flowing of water in said water line and operatively interconnected with said switch for rendering closure of the switch dependent upon flow of water in said water line.

9. In combination, a sink or like structure having a water line connected for supplying water thereto, a waste disposal appliance connected for receiving water from said sink or like structure and having means for comminuting waste material and power means for operating said comminuting means, means for conducting water and waste material from the appliance to a sewer or the like, means in said water line operable responsively to flow of water to said sink or like structure, and control means for said power means operable dependently upon the operation of said flow responsive means.

10. In combination, a sink or like structure having a drain and a faucet connected with a water line for supplying water to the sink or like structure, a waste disposal appliance including a casing connected with said drain for receiving water from said sink or like structure and having means for discharging water and comminuted material to a sewer connection pipe or the like, said appliance having electric motor operated means for comminuting material in said casing, and control means for said appliance comprising a first switch for controlling the operation of said motor, a second switch connected in series with said first switch, and a flow actuable device in said water line operatively connected for controlling the operation of said second switch.

JAMES H. POWERS.